(12) United States Patent
Balasubramanian et al.

(10) Patent No.: US 7,899,018 B2
(45) Date of Patent: Mar. 1, 2011

(54) AUTOMATIC RESIGNATION FROM AD HOC NETWORK

(75) Inventors: Srinivasan Balasubramanian, San Diego, CA (US); Lalit Yerramilli Raju, San Diego, CA (US); Manoj M. Deshpande, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 737 days.

(21) Appl. No.: 11/858,782

(22) Filed: Sep. 20, 2007

(65) Prior Publication Data
US 2008/0075054 A1 Mar. 27, 2008

Related U.S. Application Data

(60) Provisional application No. 60/846,581, filed on Sep. 21, 2006.

(51) Int. Cl.
| H04L 1/00 | (2006.01) |
| H04L 12/16 | (2006.01) |
| H04J 1/16 | (2006.01) |
| G08C 15/00 | (2006.01) |
| G06F 11/00 | (2006.01) |

(52) U.S. Cl. .................. 370/338; 370/252; 370/311; 370/355; 455/41; 455/574

(58) Field of Classification Search ......... 370/335–352, 370/401–412, 251–311; 455/343–414, 557–574
See application file for complete search history.

(56) References Cited

U.S. PATENT DOCUMENTS

| 6,192,230 | B1 * | 2/2001 | van Bokhorst et al. ... 455/343.3 |
| 6,947,776 | B2 * | 9/2005 | Vollmer et al. ............. 455/574 |
| 7,609,644 | B2 * | 10/2009 | Tateson ..................... 370/252 |
| 7,656,831 | B2 * | 2/2010 | Gao et al. ................... 370/311 |
| 7,660,578 | B2 * | 2/2010 | Viitamaki et al. ......... 455/426.2 |
| 7,715,885 | B2 * | 5/2010 | Arunan et al. ............. 455/574 |
| 2003/0086379 | A1 * | 5/2003 | Terry et al. ................. 370/279 |
| 2006/0140135 | A1 | 6/2006 | Bonta et al. |
| 2007/0133479 | A1 * | 6/2007 | Montojo et al. ............ 370/335 |
| 2008/0125190 | A1 * | 5/2008 | Jan et al. ................... 455/574 |
| 2008/0232286 | A1 * | 9/2008 | Habetha et al. ............ 370/311 |
| 2009/0086660 | A1 * | 4/2009 | Sood et al. ................. 370/311 |

FOREIGN PATENT DOCUMENTS

| EP | 0907262 | 4/1999 |
| EP | 1427153 | 6/2004 |
| EP | 1473951 | 11/2004 |

OTHER PUBLICATIONS

International Search Report—PCT/US07/079129, International Search Authority—European Patent Office—Apr. 9, 2008.

* cited by examiner

*Primary Examiner*—M. Phan
(74) *Attorney, Agent, or Firm*—Florin Corie; Abdollah Katbab (57) ABSTRACT

A wireless device is configured to automatically resign from an ad hoc network. In some aspects the resignation may be based on automatic detection of inactivity associated with the ad hoc network. For example, resignation from the ad hoc network may be based on absence of uplink and downlink traffic at a wireless device, absence of open sockets at a wireless device, or a lack of beacon transmissions by other wireless devices. In the latter case, a lack of beacon transmissions by other wireless devices in the ad hoc network may be indicated by the transmission of a relatively large number of beacons in succession by a wireless device.

39 Claims, 10 Drawing Sheets

AUTOMATIC RESIGNATION FROM AD HOC NETWORK

CLAIM OF PRIORITY UNDER 35 U.S.C. §119

This application claims the benefit of and priority to commonly owned U.S. Provisional Patent Application No. 60/846,581, filed Sep. 21, 2006, the disclosure of which is hereby incorporated by reference herein.

BACKGROUND

1. Field

This application relates generally to wireless communication and more specifically, but not exclusively, to triggers for resigning from an ad hoc network.

2. Background

A wireless communication system may comprise a network of two or more wireless devices were each wireless device may support one or more communication technologies to wirelessly transmit information to and/or receive information from another device in the network. A wireless network may be implemented in various ways. For example, some types of wireless networks utilize a central coordinator while other types of wireless networks may not utilize a central coordinator.

In general, a central coordinator may provide functionality that supports traffic flow to and from the wireless devices in a network. For example, a Wi-Fi (i.e., 802.11-based) access point may transmit beacons that enable wireless devices to detect and connect to the corresponding network. To this end, the beacons may include a network identifier and information relating to contention control for the network. In addition, the beacons may include information that informs a wireless device that the central controller has buffered data that needs to be transmitted to the wireless device.

In contrast, a set of wireless devices may establish an ad hoc wireless network whereby the wireless devices may communicate with one another without the use of a central coordinator. In this case, functionality that may otherwise be provided by a central coordinator (e.g., an access point) such as, for example, generating beacons and buffering traffic, may instead be implemented in and shared among all of the wireless devices that form the ad hoc network.

SUMMARY

A summary of sample aspects of the disclosure follows. It should be understood that any reference to the term aspects herein may refer to one or more aspects of the disclosure.

The disclosure relates in some aspects to resigning from an ad hoc network. For example, a device such as a wireless access terminal (e.g., station) may be configured to automatically resign from an ad hoc network based on one or more triggering conditions in the event a user of the device does not formally resign from the ad hoc network.

The disclosure relates in some aspects to resigning from an ad hoc network when all of the other wireless devices that were previously associated with the ad hoc network have effectively left the ad hoc network. For example, a device may be configured to automatically resign from an ad hoc network when the device is moved away from a coverage area associated with the ad hoc network. Similarly, a device may be configured to automatically resign from an ad hoc network when the other devices of the network have moved away from the device or have been turned off without formally resigning from the ad hoc network.

The disclosure relates in some aspects to monitoring activity associated with an ad hoc network to determine whether to resign from the ad hoc network. For example, in some implementations a device may be configured to automatically resign from an ad hoc network in the event the device does not have any uplink or downlink traffic associated with the ad hoc network for at least a defined period of time. In some implementations a device may be configured to automatically resign from an ad hoc network in the event the device does not have any open sockets associated with the ad hoc network for at least a defined period of time. In some implementations a device may be configured to automatically resign from an ad hoc network in the event no other devices are transmitting beacons. For example, the device may automatically resign from the ad hoc network if it has been the only device transmitting beacons for at least a defined period of time or a defined number of beacons.

BRIEF DESCRIPTION OF THE DRAWINGS

Sample features, aspects and advantages of the disclosure will be described in the detailed description and appended claims that follow, and in the accompanying drawings, wherein:

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Figure 1:
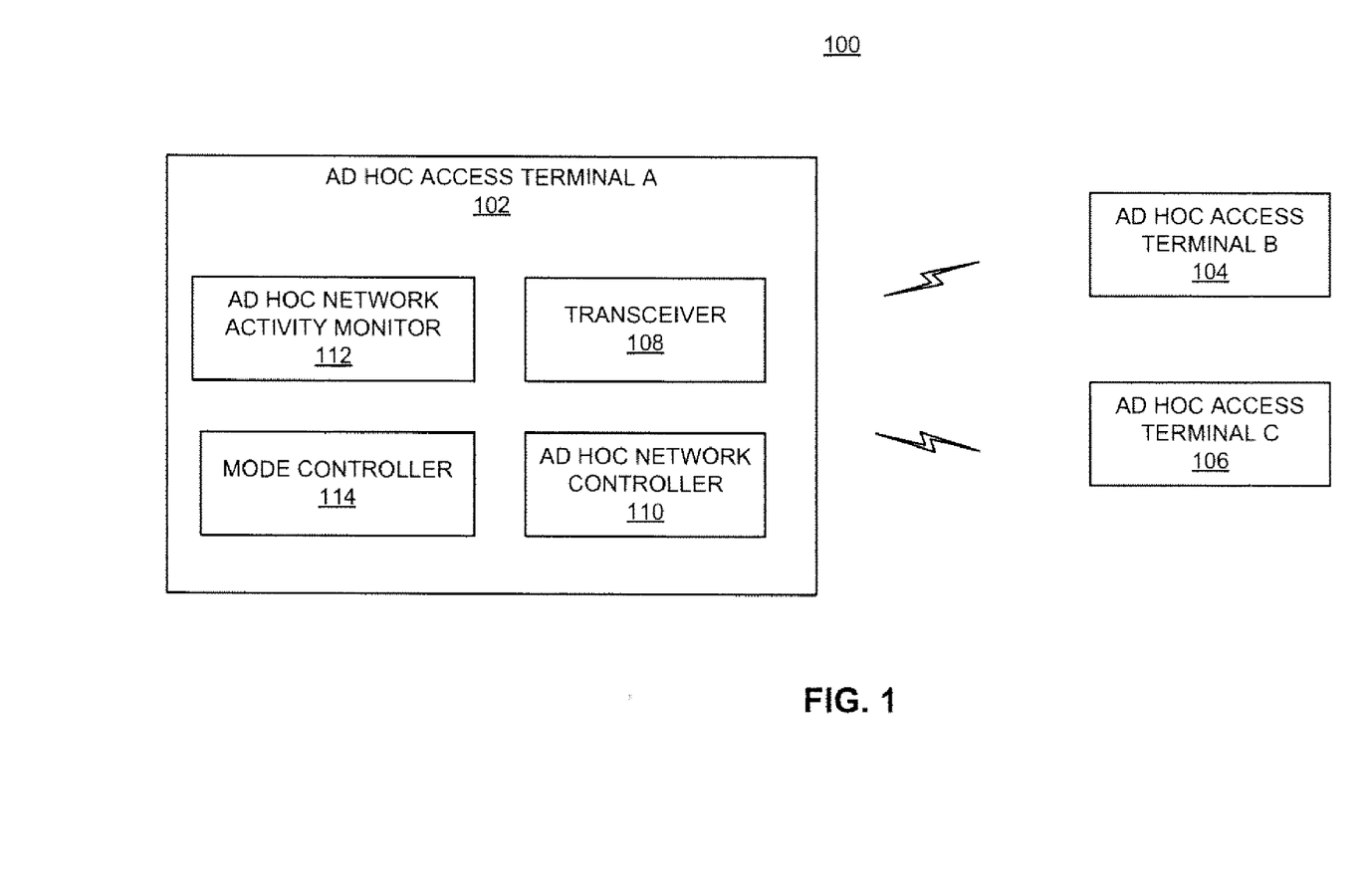
FIG. 1 is a simplified block diagram of several sample aspects of a communication system comprising an ad hoc network.

FIG. 1 illustrates sample aspects of a wireless ad hoc network 100 comprising a plurality of wireless devices (e.g., mobile devices). In this example, an access terminal 102 may communicate with an access terminal 104 and/or an access terminal 106. It should be appreciated that a wireless ad hoc network constructed in accordance with the teachings herein may comprise a different combination of wireless devices.

The wireless terminal 102 is depicted as including several components 108-114. For convenience, the blocks 108-114 are only illustrated for the device 102. It should be appreciated, however, that other devices (e.g., devices 104 and 106) of the ad hoc network 100 may include similar components.

A transceiver 108 provides appropriate functionality for establishing wireless communication with one or more wireless devices via an appropriate wireless medium. As will be discussed in more detail below, the transceiver 108 may comprise one or more transmitters and one or more receivers for communicating with a wireless ad hoc network and, optionally, some other type of network.

An ad hoc network controller 110 provides appropriate functionality for establishing communication with one or more wireless devices via an ad hoc network. For example, the controller 110 may provide functionality relating to establishing, resigning from, locating, and joining an ad hoc network.

An ad hoc network activity monitor 112 monitors activity associated with the ad hoc network 100. As will be discussed in more detail below, this activity may relate to operations of the terminal 102 and/or operations of another wireless device.

The terminal 102 also may include a mode controller 114 that controls a mode of operation of the terminal 102. For example, the mode controller 114 may control whether one or more components of the terminal 102 operate in an active state (e.g., a fully operational mode) or a power save state (e.g., low-power mode).

Sample operations of a wireless communication system such as the network 100 will be discussed in more detail in conjunction with the flowchart of FIG. 2. For convenience, the operations of FIG. 2 (or any other operations discussed or taught herein) may be described as being performed by specific components (e.g., components of the system 100). It should be appreciated, however, that these operations may be performed by other types of components and may be performed using a different number of components. It also should be appreciated that one or more of the operations described herein may not be employed in a given implementation.

Figure 2:
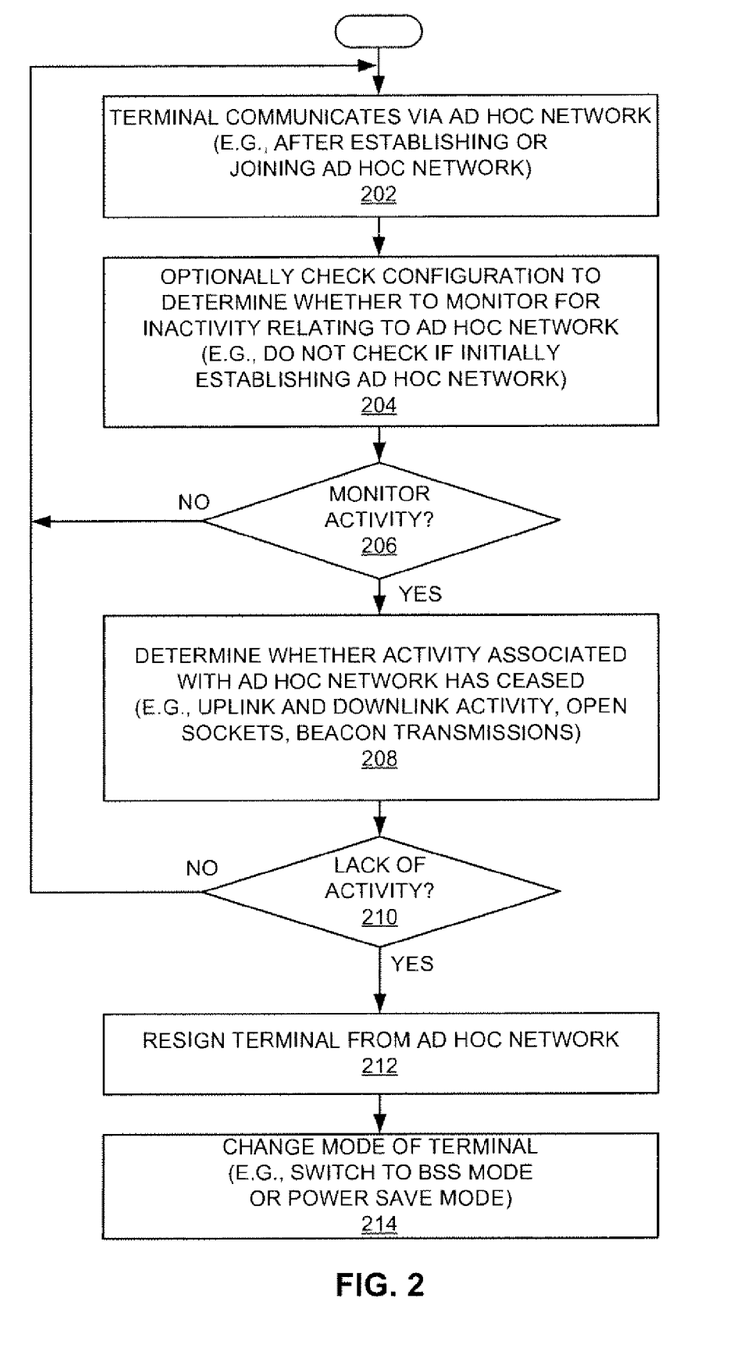
FIG. 2 is a flowchart of several sample aspects of operations that may be performed to resign from an ad hoc network.

As represented by block 202 of FIG. 2, at some point in time the terminal 102 establishes communication via an ad hoc network. In some scenarios, this operation may involve establishing an ad hoc network. For example, the terminal 102 (e.g., the components 108 and 110) may generate and transmit beacons that advertise the availability of an ad hoc network. In other scenarios, the operation of block 202 may involve joining an ad hoc network. For example, the components 108 and 110 may monitor one or more wireless communication channels for beacons associated with an ad hoc network. In the event an ad hoc network is found, the components 108 and 110 may perform the appropriate operations to join this ad hoc network.

After establishing communication via an ad hoc network, the terminal 102 may be configured to automatically determine whether it should resign from the ad hoc network at some point in time. Automatic resignation from the ad hoc network may be called for, for example, when the terminal 102 ceases to communicate via the ad hoc network but has not formally resigned from the ad hoc network (e.g., ad hoc mode of the terminal 102 is still enabled). This may be the case, for example, if the terminal 102 is the last device associated with the ad hoc network or if there are no longer any applications of the terminal 102 that are currently communicating via the ad hoc network.

As an example of the former case, a user of the terminal 102 may move the terminal 102 out of the wireless coverage area the other devices of the ad hoc network. As a result, the terminal 102 may no longer be able to communicate with the other devices. As an example of the latter case, the user may stop using an application that previously transmitted or received data via the ad hoc network (e.g., the user is no longer "playing" on the network). In either of these cases, the user may not have invoked the functionality that causes the terminal 102 to resign from the ad hoc network. Consequently, the terminal 102 may remain configured to perform ad hoc network-related operations such as generating beacons and monitoring traffic on the network.

Automatic resignation also may be called for when the user of the only other device associated with the ad hoc network moves that device away from the terminal 102 or turns off that device without resigning from the ad hoc network (i.e., leaving the terminal 102 as the last device in the ad hoc network). In this case, the terminal 102 may again remain configured to perform ad hoc network-related operations such as generating beacons and monitoring traffic on the network even though there are no longer any other devices associated with the ad hoc network.

In some aspects, resignation from the ad hoc network may be predicated on inactivity relating to the ad hoc network. Consequently, as will be discussed in more detail below, the terminal 102 may be configured to monitor for such inactivity to determine whether to resign from the ad hoc network.

As represented by block 204, under some circumstances the terminal 102 may optionally be configured to not monitor for inactivity relating to the ad hoc network. For example, a decision may be made to not monitor for inactivity for a given period of time after the terminal 102 commences trying to establish an ad hoc network (e.g., by sending out beacons) since inactivity may be expected at this time. Here, by temporarily disabling the automatic resignation mechanism when establishing the ad hoc network, other devices may be given more time to discover and associate with the new network. Similarly, in some implementations inactivity monitoring may not be activated until at least one other terminal has joined the ad hoc network. Accordingly, as represented by block 206, in the event the terminal 102 is currently configured to not monitor for inactivity, the terminal 102 may continue communicating via the ad hoc network (block 202) and continue checking the current configuration (block 204).

Conversely, if monitoring is enabled at block 206 the operation flow proceeds to block 208. As mentioned above, monitoring may be enabled here in the event the configuration of the terminal 102 has changed (e.g., upon expiration of an appropriate timer) or in the event inactivity monitoring is always enabled.

At block 208 the activity monitor 112 may determine whether activity associated with the ad hoc network has ceased for at least a defined (e.g., configurable) period of time or a defined (e.g., configurable) number of events. As will be discussed in more detail in conjunction with FIGS. 3-8, the activity may relate to activity on an uplink and a downlink, activity associated with at least one open socket, or activity relating to the transmission of beacons.

As represented by block 210, in the event the activity monitor 112 detects activity associated with the ad hoc network, the terminal 102 may continue communicating via the ad hoc network (block 202) and continue monitoring for inactivity (block 208). If, on the other hand, the activity monitor 112 detects inactivity associated with the ad hoc network, the operation flow proceeds to block 212.

Accordingly, at block 212 the terminal may resign from the ad hoc network. Consequently, the terminal 102 may stop sending beacons for the ad hoc network, stop transmitting data over the ad hoc network, and stop monitoring for any communication on the ad hoc network.

In conjunction with the resignation at block 212, the mode controller 114 may change the mode of the terminal 102 by, for example, changing a mode of operation of one or more of the components of the terminal 102 (block 214). For example, in some implementations the mode controller 114 sets the terminal 102 to a basic service set ("BSS") mode upon resignation from the ad hoc network. In this way, the terminal 102 may establish communication with some other type of network (e.g., an infrastructure-based network). Here, in the event the user wishes to communicate with an ad hoc network at some later point in time, the user may invoke the appropriate functionality to switch the terminal 102 back to the ad hoc mode.

In some implementations the mode controller 114 sets the terminal 102 to a power save mode (e.g., a low-power state) upon resignation from the ad hoc network. In this way, the operating life of a battery that is used to power the terminal 102 may be extended since energy will not be wasted on unnecessary ad hoc network-related operations. Once power save mode is invoked, the terminal 102 may go off-line and occasionally (e.g., periodically) monitor for network activity. For example, the terminal 102 may monitor for traffic associated with an ad hoc network or an access point (e.g., by invoking a BSS mode). In some implementations, in the event network activity is detected, the terminal 102 may automatically invoke the appropriate mode to associate with the detected network (e.g., by switching from the power save mode to an active mode). In some implementations, the user may manually invoke the appropriate functionality to switch the terminal 102 back to the ad hoc mode.

With the above overview in mind, additional details relating to monitoring for ad hoc network-related inactivity will be described in conjunction with FIGS. 3-8. These figures depict a few representative examples of operations and components that may be employed in conjunction with the teachings herein. For example, FIGS. 3, 5, and 7 relate to operations that may be performed by a wireless device (e.g., terminal 102). Similarly, FIGS. 4, 6, and 8 relate to components that may be incorporated into a wireless device (e.g., similar to terminal 102). It should be understood that the teachings herein may be implemented in other ways.

Figure 3:
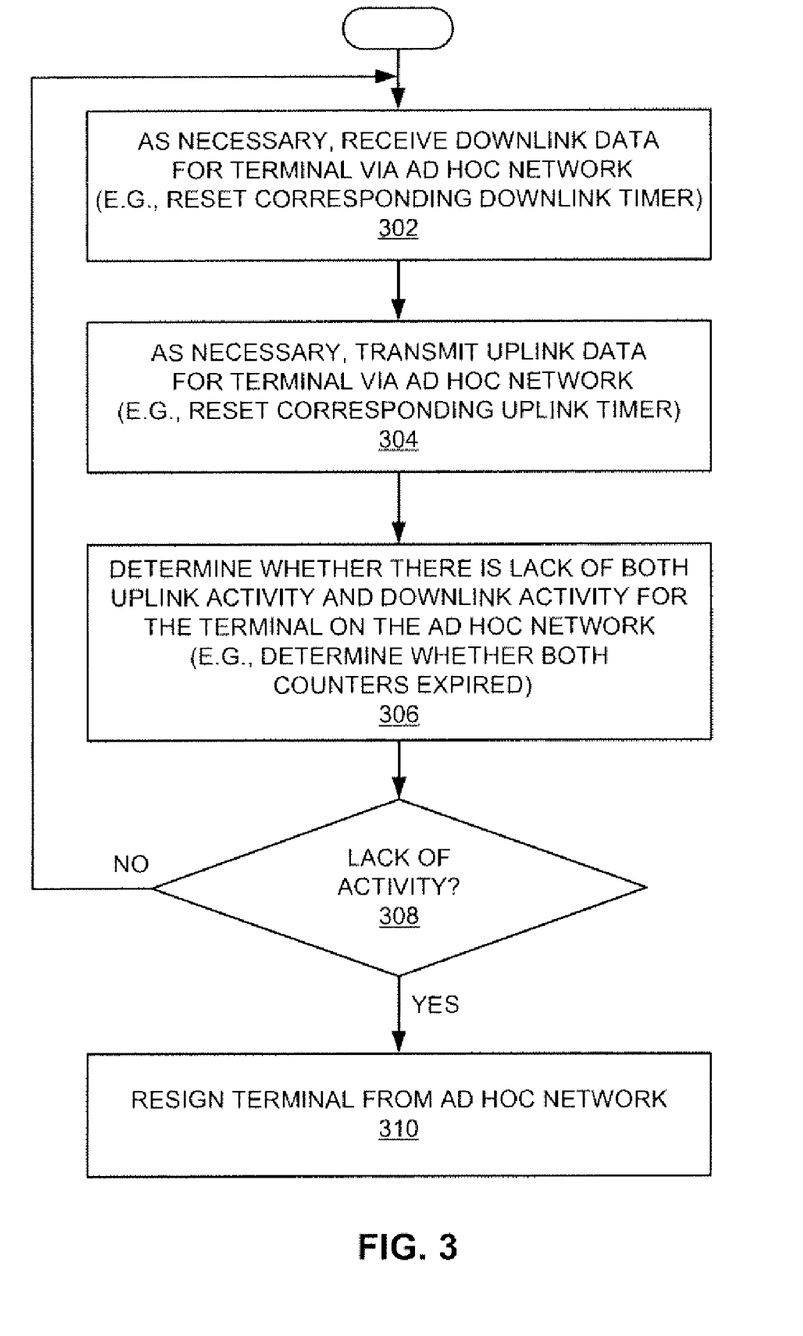
FIG. 3 is a flowchart of several sample aspects of operations that may be performed to resign from an ad hoc network based on uplink and downlink traffic.
Figure 4:
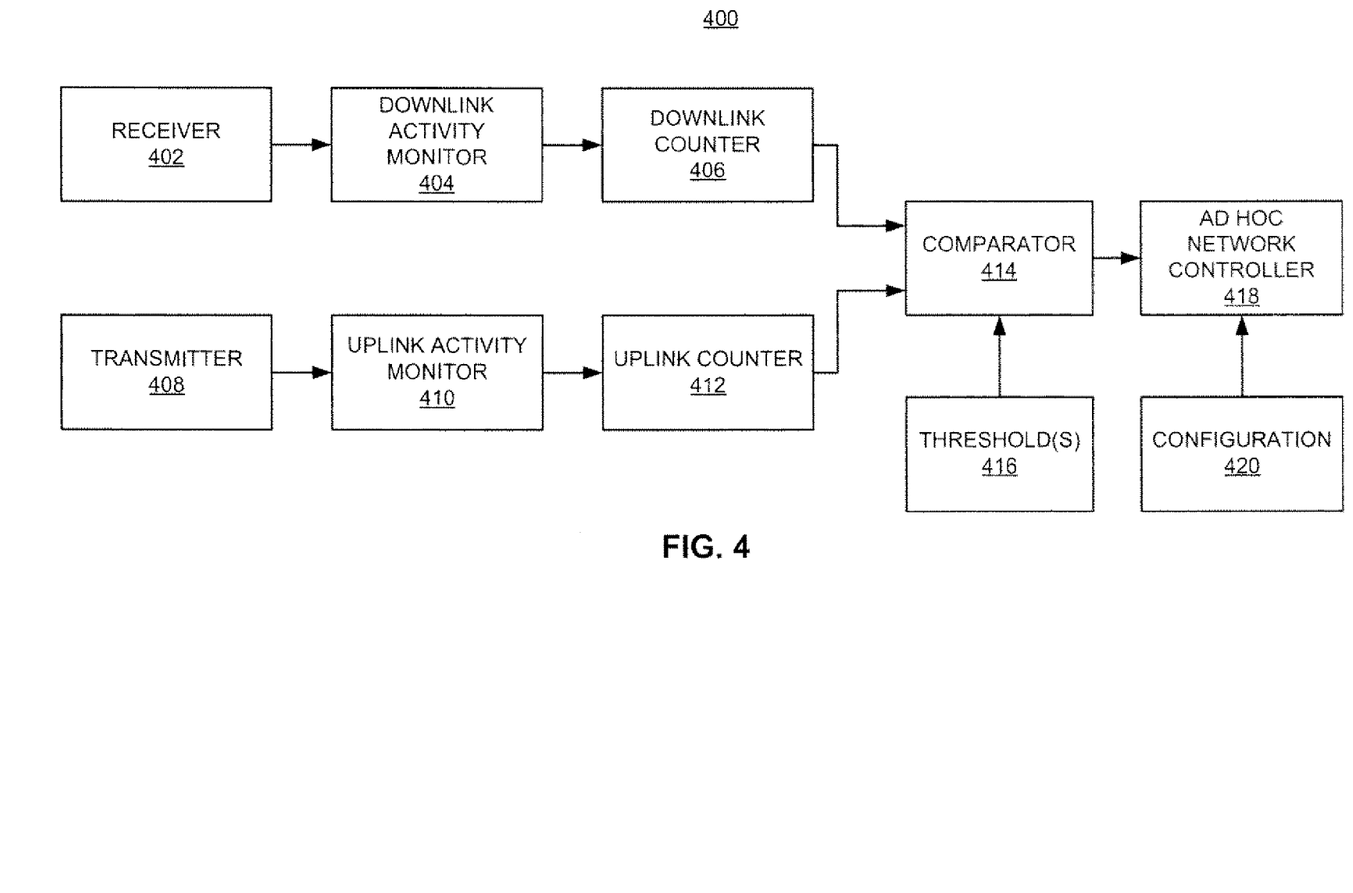
FIG. 4 is a simplified block diagram of several sample aspects of components of a device that may be configured to resign from an ad hoc network based on uplink and downlink traffic.

FIGS. 3 and 4 relate, respectively, to sample operations and functional components that may be employed to monitor uplink and downlink traffic. Here, a decision to resign from an ad hoc network is based on whether a wireless device is no longer transmitting uplink traffic via the ad hoc network and is no longer receiving downlink traffic via the ad hoc network. For example, a determination of inactivity may be made based on the absence of uplink traffic and downlink traffic for a least a given period of time.

As represented by block 302 of FIG. 3, a receiver 402 may receive, via an ad hoc network, downlink traffic destined for a wireless device 400 (FIG. 4). A downlink activity monitor 404 cooperates with the receiver 402 to monitor the presence or absence of downlink traffic. The activity monitor 404 may thereby determine whether the ad hoc network downlink for the device 400 has been inactive for a defined period of time. For example, in some implementations the activity monitor 404 may reset a free-running downlink timer (e.g., counter 406) whenever there is downlink activity.

As represented by block 304 of FIG. 3, a transmitter 408 may transmit uplink traffic from the wireless device 400 via the ad hoc network. In this case, an uplink activity monitor 410 cooperates with the transmitter 408 to monitor the presence or absence of uplink traffic. The activity monitor 410 may thereby determine whether the ad hoc network uplink for the device 400 has been inactive for a defined period of time. For example, in some implementations the activity monitor 410 may reset a free-running uplink timer (e.g., counter 412) whenever there is uplink activity.

The activity monitors 404 and 410 may be implemented in various ways. For example, in some implementations the activity monitors 404 and 410 may be implemented at the media access control ("MAC") level and perform operations relating to determining whether any packets are being transmitted or received at the MAC level. Thus, in some implementations the operations of FIGS. 3 and 4 may involve declaring inactivity at the MAC level.

At block 306, the device 400 determines whether there is inactivity on both the uplink and the downlink. For example, in some implementations a comparator 414 may compare the current counts of the downlink and uplink counters 406 and 412 with one or more thresholds 416. With reference to the example mentioned above, the comparator 414 may determine whether the counters 406 and 412 have expired (e.g., the counts of both counters 406 and 412 have reached zero).

Various techniques may be employed to determine whether the uplink and downlink have been inactive. For example, in some implementations each time activity is detected, a timer (e.g., counter 406 or 412) may be set to a value that corresponds to a given period of time (e.g., five seconds). In the event one of the timers expires, the corresponding uplink or downlink may be declared inactive. In the event both the uplink and the downlink are declared inactive, the device 400 may generate an indication of lack of activity for the ad hoc network.

In some implementations the inactivity time period (e.g., count) may be defined based on one or more operational parameters of the device 400. For example, in implementations where it is desirable to reduce the power consumption of the device 400, the inactivity time period may be set to a relatively small value. Conversely, in the event the device 400 is attempting to establish the ad hoc network, the inactivity time period may be set to relatively large value.

As represented by block 308, if the uplink or the downlink has been active at some point in time during the defined period(s) of time, the device 400 continues its normal operations (e.g., transmitting uplink traffic and receiving downlink traffic, as necessary). Thus, as shown in FIG. 3, the operational flow may proceed back to block 302 and the device 400 may continue to monitor for uplink and downlink inactivity.

Conversely, if a lack of activity for the ad hoc network has been declared at block 308, an ad hoc network controller 418 may resign the device 400 from the ad hoc network (block 310). As a result, the ad hoc network controller 418 may cease beacon generation operations for the ad hoc network and may cease monitoring the ad hoc network.

As mentioned above, a decision to resign from the ad hoc network may be based on a current configuration 420 of the device 400. For example, the ad hoc network controller 418 may not resign from the ad hoc network at this point in time if the device 400 is in the process of attempting to establish the ad hoc network. It should be appreciated that such a decision may be implemented in various ways. For example, in some implementations the configuration information 420 may be utilized to determine whether to activate the counters 406 and 412. In addition, in some implementations the configuration information 420 may be utilized by the monitors 404 and 410 to determine whether to monitor activity at block 302 and 304, respectively.

Figure 5:
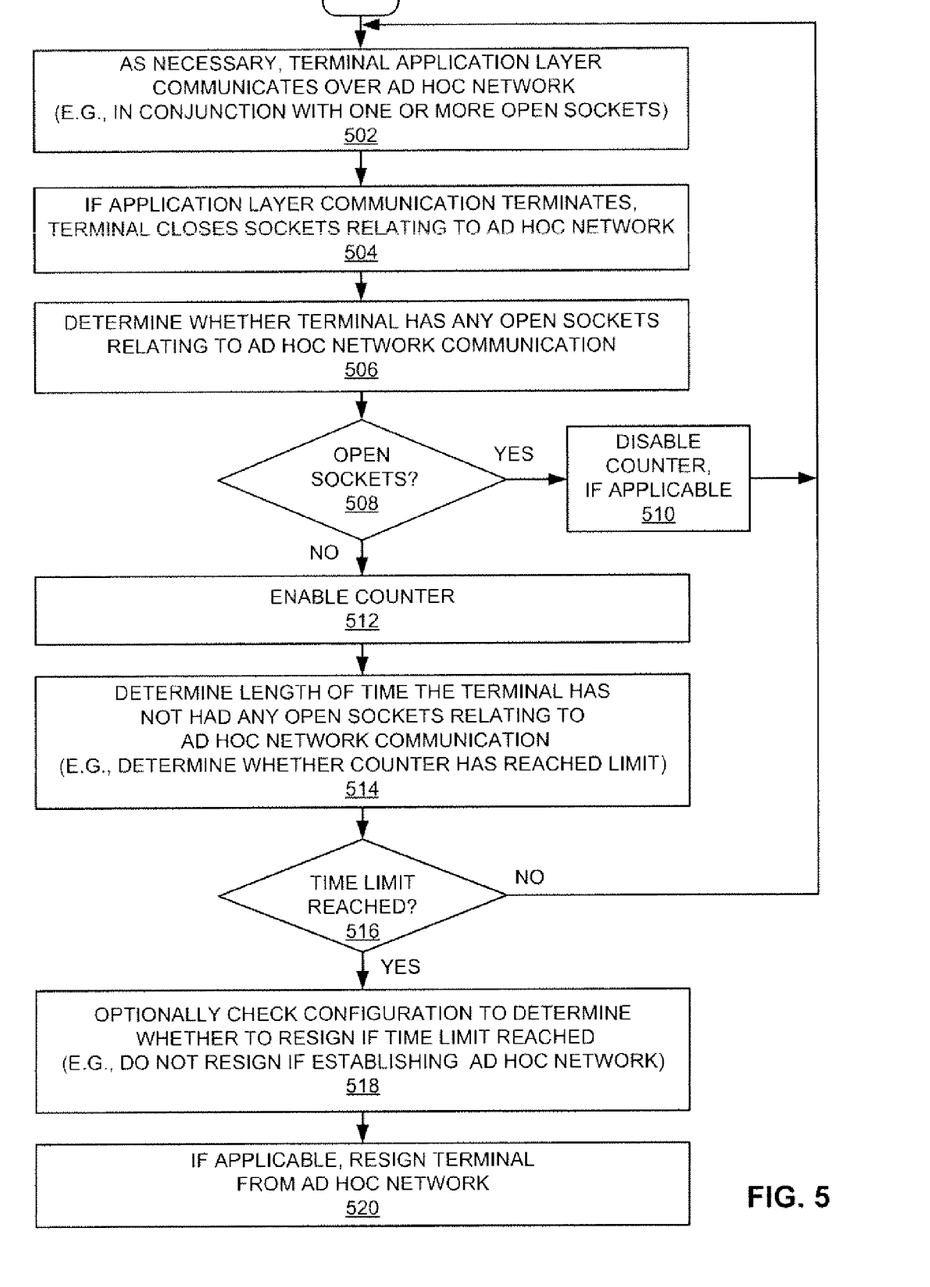
FIG. 5 is a flowchart of several sample aspects of operations that may be performed to resign from an ad hoc network based on open sockets.
Figure 6:
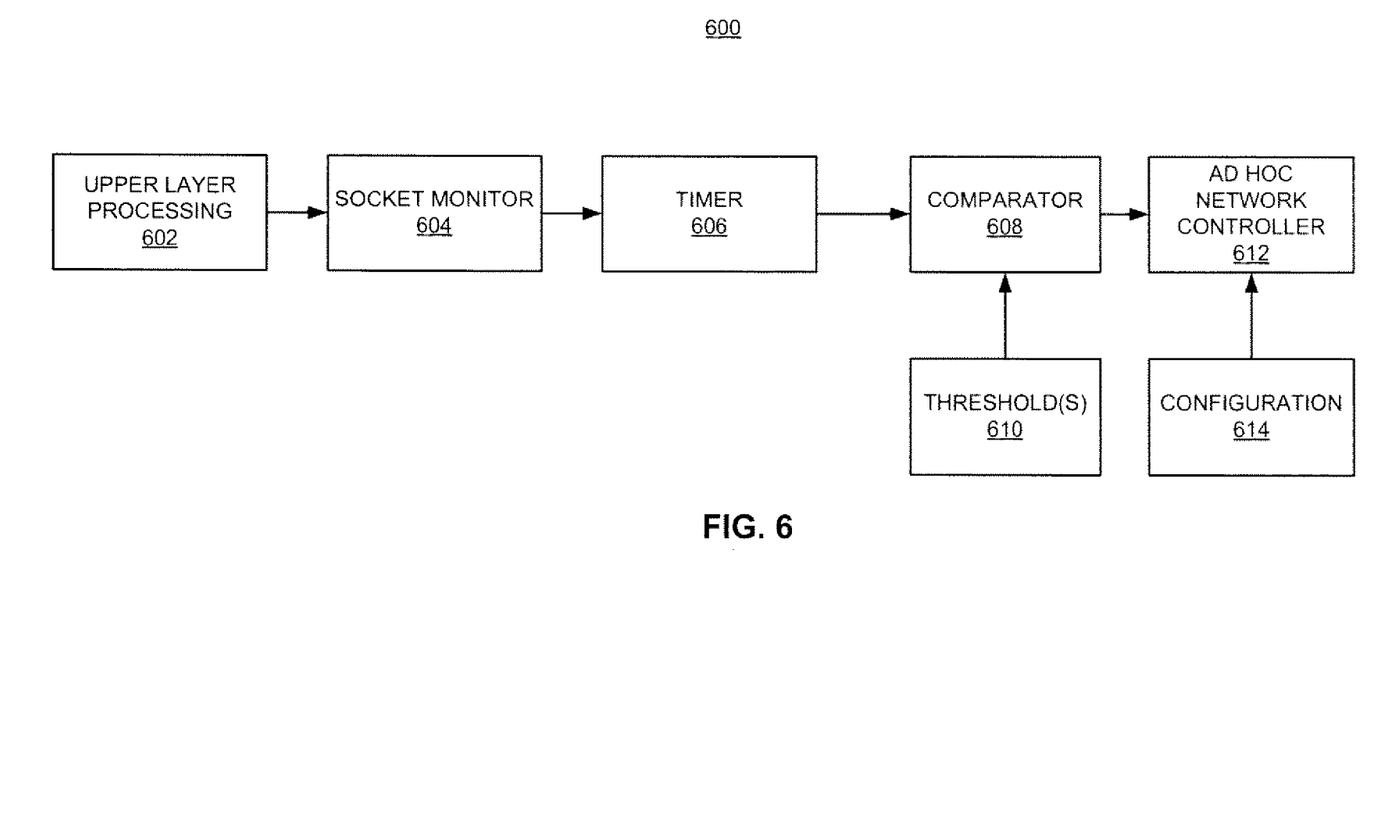
FIG. 6 is a simplified block diagram of several sample aspects of components of a device that may be configured to resign from an ad hoc network based on open sockets.

Referring now to FIGS. 5 and 6, in some implementations monitoring of the ad hoc network involves determining whether there are any open sockets relating to the ad hoc network. Here, a decision to resign from the ad hoc network may be based on an absence of application level activity associated with the ad hoc network. For example, in the event there have not been any open sockets relating to communication via the ad hoc network for least a given period of time, a terminal may be configured to resign from the ad hoc network.

Under some circumstances, an activity monitor that is based on monitoring of open sockets may detect inactivity associated with an ad hoc network when an activity monitor based on uplink and downlink traffic does not detect inactivity. For example, it is possible for downlink traffic to be active when a user has closed an application that was listening to received data (e.g., data for a streaming application). In this case, the application will no longer be processing the received data. For example, upper layer processing may simply ignore any packets that are received via the ad hoc network. In such a case, a downlink monitor may still indicate activity on the ad hoc network. Thus, an implementation that only relies on an uplink and downlink activity monitor may not resign from the ad hoc network under the use circumstances. To overcome this issue, an activity monitor that is based on monitoring of open sockets may override any resignation decision made by an activity monitor that monitors downlink traffic.

As represented by block 502 of FIG. 5, an upper layer (e.g., application layer) processing component 602 of a wireless device 600 (FIG. 6) may communicate via an ad hoc network. To this end, the processing component 602 may open one or more network sockets (e.g., Internet Protocol-based sockets such as TCP/UDP sockets) to transmit data to and receive data from a similar processing component of a remotely located device (not shown in FIG. 6). As an example, a socket may specify a protocol, source and destination IP addresses, and source and destination ports. As represented by block 504, in the event the upper layer communication terminates, the processing component 602 may close any socket that was opened in conjunction with the upper layer communication.

Accordingly, as represented by block 506, a socket monitor 604 may repeatedly (e.g., continually) monitor the sockets associated with the upper layer communication. The socket monitor 604 may be implemented in various ways. For example, in some implementations the socket monitor 604 may comprise an upper layer process that generates an appropriate indication whenever there are any open sockets or no open sockets.

As represented by block 508, the socket monitor 604 determines whether there are open sockets associated with the ad hoc network. At block 510, in the event there is at least one open socket associated with the ad hoc network, the socket monitor 604 may disable the timing operation of a timer 606 (e.g., a counter) that is configured to keep track of the amount of time there are no open sockets associated with the ad hoc network. The operational flow may then proceed back to block 502 whereby the device 600 continues communicating via the ad hoc network, as necessary.

On the other hand, if there are no open sockets at block 508, the socket monitor 604 may enable the timer 606 at block 512. In some implementations this may involve, for example, initializing the timer to a defined value (e.g., five seconds) and starting the timer 606 so that it counts down from this value.

At block 514 the device 600 determines whether there is an absence of upper layer (e.g., application level) activity associated with the ad hoc network. For example, in some implementations a comparator 608 may compare the current count of the timer 606 with one or more thresholds 610. With reference to the example mentioned above, the comparator 608 may determine whether the timer 606 has expired (e.g., the count of the timer 606 has reached zero).

The socket inactivity time period (e.g., count) may be defined based on one or more operational parameters of the device 600. For example, in a similar manner as discussed above, if it is desirable to reduce the power consumption of the device 600, a socket inactivity time period may be set to a relatively small value. Conversely, if the device 600 is attempting to establish the ad hoc network, the socket inactivity time period may be set to relatively large value.

If it is determined at block 516 that there has been at least one open socket within a defined period of time, the device 600 continues communicating via the ad hoc network, if applicable. Accordingly, the operational flow proceeds back to block 502 whereby the device 600 may continue to monitor for upper layer inactivity.

If it is determined at block 516 that there have not been any open sockets for a least a defined period of time, an ad hoc network controller 612 may determine whether to resign from the ad hoc network (block 518). For example, in a similar manner as discussed above, in some implementations a decision to resign from the ad hoc network may be based on current configuration information 614 (e.g., similar to the configuration information 420).

If applicable, at block 520 the ad hoc network controller 612 may then resign the device 600 from the ad hoc network. Again, the ad hoc network controller 612 may cease beacon generation operations for the ad hoc network and may cease monitoring the ad hoc network.

Figure 7:
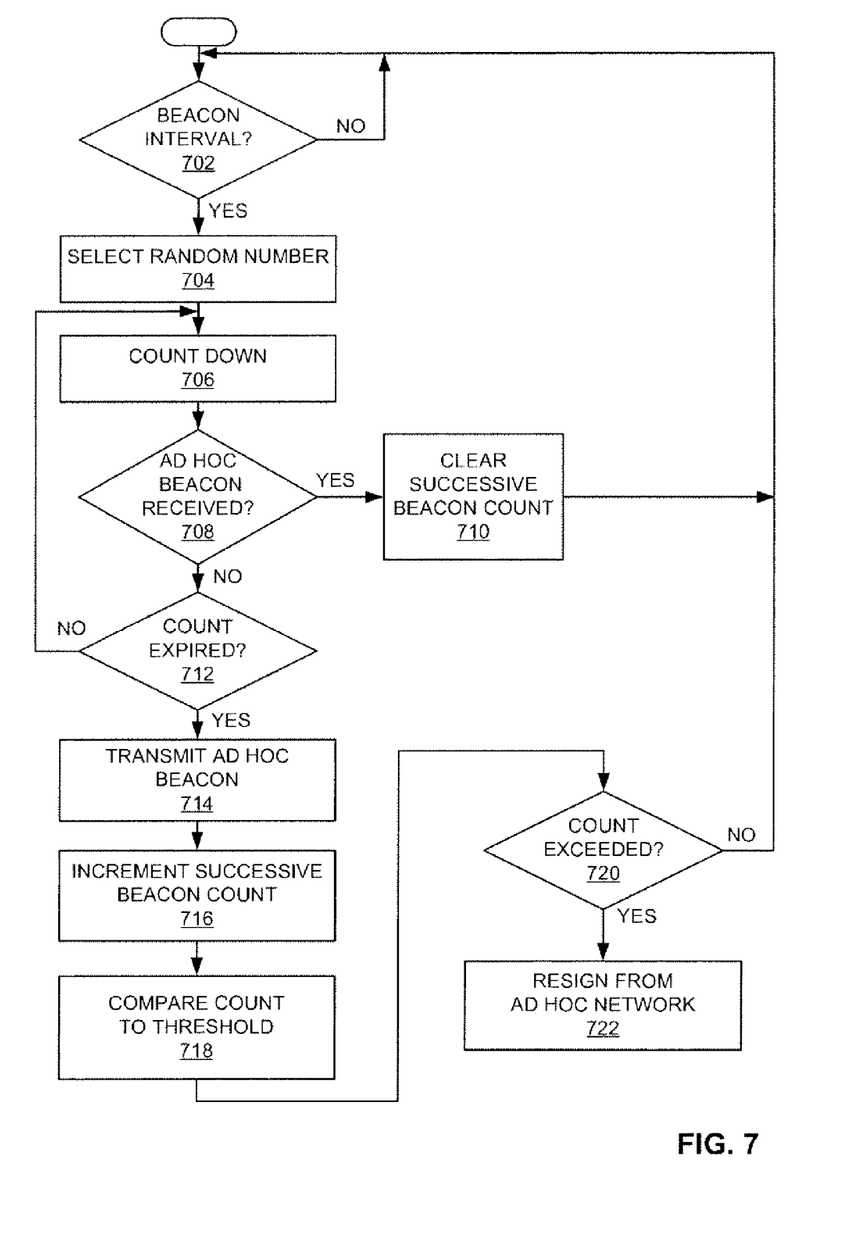
FIG. 7 is a flowchart of several sample aspects of operations that may be performed to resign from an ad hoc network based on transmission of successive beacons.
Figure 8:
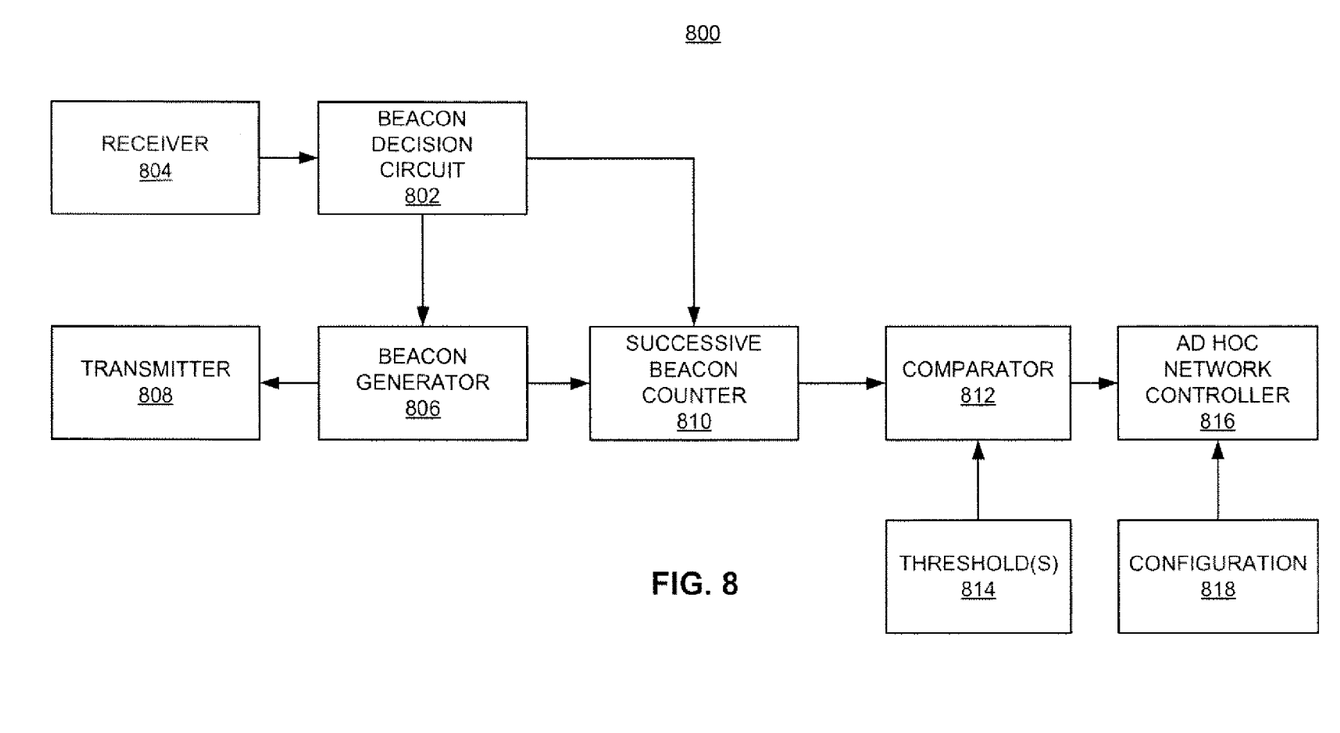
FIG. 8 is a simplified block diagram of several sample aspects of components of a device that may be configured to resign from an ad hoc network based on transmission of successive beacons.

Referring now to FIGS. 7 and 8, in some implementations monitoring of the ad hoc network relates to determining whether no other terminals are transmitting beacons for the ad hoc network. For example, a decision to resign from the ad hoc network may be based on a determination that a terminal has transmitted a relatively large number of beacons in succession. In such a case, given that no other terminals are transmitting beacons for the ad hoc network, it may be assumed that there are no other terminals associated with the ad hoc network.

As mentioned above, the wireless devices that are associated with an ad hoc network may share the task of generating beacons for the ad hoc network. Blocks 702-714 of FIG. 7 illustrates sample operations that a wireless device 800 (FIG. 8) may perform in conjunction with generating beacons for an ad hoc network.

As represented by block 702 of FIG. 7, a beacon decision circuit 802 initiates beacon-related operations based on a defined beacon interval (e.g., 100 milliseconds) for the ad hoc network. As an example, the beacon decision circuit 802 may start a timer each time a beacon is transmitted for the ad hoc network. Here, the beacon decision circuit 802 may start the timer whenever a receiver 804 of the device 800 receives a beacon or whenever a beacon generator 806 of the device 800 generates a beacon that is transmitted by a transmitter 808. As represented by the "NO" decision arrow of FIG. 7, the beacon decision circuit 802 waits until the next scheduled beacon transmission time to determine whether the device 800 is to transmit the next beacon for the ad hoc network.

In some implementations transmission of ad hoc beacons among different wireless devices is accomplished by configuring each wireless device to randomly select a time to transmit a beacon after each scheduled beacon transmission time (e.g., in accordance with a collision avoidance scheme). Here, in the event a given wireless device receives a beacon from another wireless device before the randomly selected beacon transmission time of the given wireless device, the given wireless device will refrain from transmitting a beacon for the current beacon interval. In this way, one of the wireless devices of the ad hoc network may be randomly selected to transmit a beacon for each beacon interval.

Blocks 704 through 712 of FIG. 7 describe an embodiment where a random beacon transmission time is selected for each scheduled beacon transmission time by counting down from a randomly selected number. Thus, at block 704 the beacon decision circuit 802 selects a random number as the initial value of the count. At block 706 the beacon decision circuit 802 decrements the count. At block 708, the beacon decision circuit 802 determines whether an ad hoc beacon has been received by the receiver 804. If so, at block 710 the beacon decision circuit 802 will clear a successive beacon counter 810 (discussed below) and the operational flow returns to block 702 to wait for the next scheduled beacon transmission time.

If an ad hoc beacon has not been received at block 708, the beacon decision circuit 802 determines whether the count has expired (e.g., reached zero). If the count has not expired, the beacon decision circuit 802 continues counting down at block 706 and checking to see whether a beacon has been received at block 708.

In the event the count was expired at block 712, the beacon decision circuit 802 may cause the beacon generator 806 to generate a beacon that is then transmitted by the transmitter 808 (block 714). In conjunction with the operation of block 714, the successive beacon counter. 810 may increment its count (block 716).

The device 800 may thus determine whether there is inactivity associated with the ad hoc network based on the count of the successive beacon counter 810. For example, a determination of inactivity may be based on whether the successive beacon count reaches or exceeds a threshold count. In other words, given that beacon transmissions are based on selection of a random number, is it extremely unlikely that a single wireless device will transmit a relatively large number (e.g., 600) of beacons in succession when there is more than one wireless device associated with the ad hoc network. Accordingly, when a single device does transmit a relatively large number of beacons in succession, it may be assumed that no other wireless devices are associated with the ad hoc network.

As represented by block 718, a comparator 812 may compare the current count of the successive beacon counter 810 with one or more thresholds 814. For example, the comparator 812 may determine whether the successive beacon counter 810 has reached a defined beacon count. In the event the count has not yet been exceeded at block 720, the operational flow proceeds back to block 702 to wait for the next scheduled beacon transmission time.

On the other hand, in the event the successive beacon count has been reached or exceeded (e.g., the counter 810 has expired), an ad hoc network controller 816 may resign the device 800 from the ad hoc network at block 722. In a similar manner as discussed above, in some implementations a decision to resign from the ad hoc network may be based on current configuration information 818 (e.g., similar to the configuration information 420).

It should be appreciated that various techniques may be employed to identify, based on beacon transmissions, inactivity associated with an ad hoc network. For example, in some implementations the device may keep track of whether it has transmitted successive beacons for a defined period of time (e.g., one minute). In addition, in some implementations the device 800 may keep track of the amount of time that has passed or the number of beacon intervals that have occurred since the device 800 last received a beacon from any other wireless device.

The beacon-related inactivity time period (e.g., count) may be defined based on one or more operational parameters of the device 800. For example, in implementations where it is desirable to reduce the power consumption of the device 800, this inactivity time period may be set to a relatively small value. Conversely, in the event the device 800 is attempting to establish the ad hoc network, this inactivity time period may be set to relatively large value.

Figure 9:
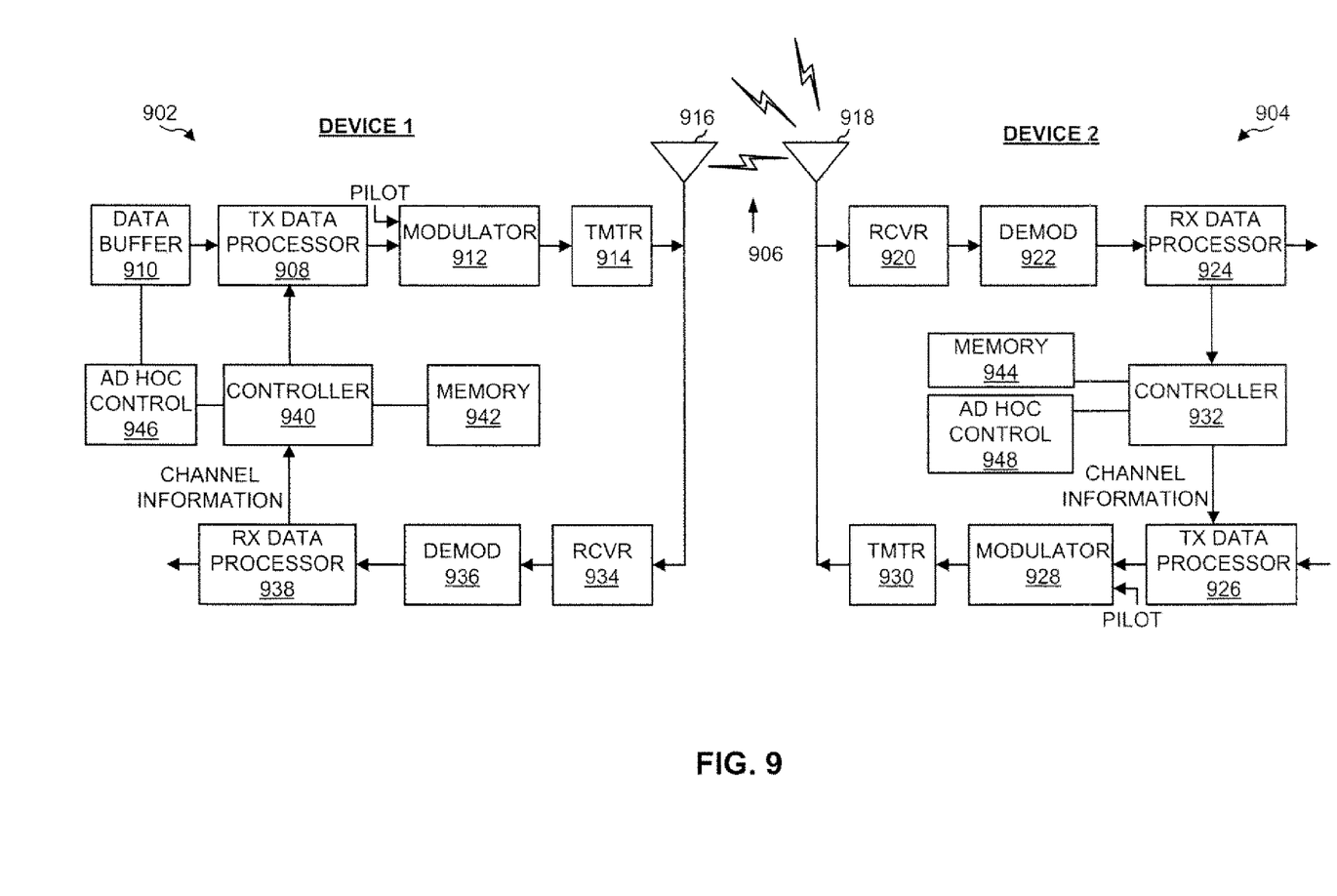
FIG. 9 is a simplified block diagram of several sample aspects of communication components.

The teachings herein may be incorporated into a device employing various components for communicating with at least one other wireless device. FIG. 9 depicts several sample components that may be employed to facilitate communication between devices. Here, a first device 902 (e.g., an access terminal) and a second device 904 (e.g., an access point) are adapted to communicate via a wireless communication link 906 over a suitable medium.

Initially, components involved in sending information from the device 902 to the device 904 (e.g., a reverse link) will be treated. A transmit ("TX") data processor 908 receives traffic data (e.g., data packets) from a data buffer 910 or some other suitable component. The transmit data processor 908 processes (e.g., encodes, interleaves, and symbol maps) each data packet based on a selected coding and modulation scheme, and provides data symbols. In general, a data symbol is a modulation symbol for data, and a pilot symbol is a modulation symbol for a pilot (which is known a priori). A modulator 912 receives the data symbols, pilot symbols, and possibly signaling for the reverse link, and performs modulation (e.g., OFDM or some other suitable modulation) and/or other processing as specified by the system, and provides a stream of output chips. A transmitter ("TMTR") 914 processes (e.g., converts to analog, filters, amplifies, and frequency upconverts) the output chip stream and generates a modulated signal, which is then transmitted from an antenna 916.

The modulated signals transmitted by the device 902 (along with signals from other devices in communication with the device 904) are received by an antenna 918 of the device 904. A receiver ("RCVR") 920 processes (e.g., conditions and digitizes) the received signal from the antenna 918 and provides received samples. A demodulator ("DEMOD") 922 processes (e.g., demodulates and detects) the received samples and provides detected data symbols, which may be a noisy estimate of the data symbols transmitted to the device 904 by the other device(s). A receive ("RX") data processor 924 processes (e.g., symbol demaps, deinterleaves, and decodes) the detected data symbols and provides decoded data associated with each transmitting device (e.g., device 902).

Components involved in sending information from the device 904 to the device 902 (e.g., a forward link) will be now be treated. At the device 904, traffic data is processed by a transmit ("TX") data processor 926 to generate data symbols. A modulator 928 receives the data symbols, pilot symbols, and signaling for the forward link, performs modulation (e.g., OFDM or some other suitable modulation) and/or other pertinent processing, and provides an output chip stream, which is further conditioned by a transmitter ("TMTR") 930 and transmitted from the antenna 918. In some implementations signaling for the forward link may include power control commands and other information (e.g., relating to a communication channel) generated by a controller 932 for all devices (e.g. terminals) transmitting on the reverse link to the device 904.

At the device 902, the modulated signal transmitted by the device 904 is received by the antenna 916, conditioned and digitized by a receiver ("RCVR") 934, and processed by a demodulator ("DEMOD") 936 to obtain detected data symbols. A receive ("RX") data processor 938 processes the detected data symbols and provides decoded data for the device 902 and the forward link signaling. A controller 940 receives power control commands and other information to control data transmission and to control transmit power on the reverse link to the device 904.

The controllers 940 and 932 direct various operations of the device 902 and the device 904, respectively. For example, a controller may determine an appropriate filter, reporting information about the filter, and decode information using a filter. Data memories 942 and 944 may store program codes and data used by the controllers 940 and 932, respectively.

FIG. 9 also illustrates that the communication components may include one or more components that perform as hoc network operations as taught herein. For example, an ad hoc control component 946 may cooperate with the controller 940 and/or other components of the device 902 to send and receive signals to another device (e.g., device 904) as taught herein. Similarly, an ad hoc control component 948 may cooperate with the controller 932 and/or other components of the device 904 to send and receive signals to another device (e.g., device 902).

The teachings herein may be incorporated into (e.g., implemented within or performed by) a variety of apparatuses (e.g., devices). For example, a wireless device may be configured or referred to as an access point ("AP"), NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. Other wireless devices (e.g., wireless terminals) may be referred to as subscriber stations. A subscriber station also may be known as a subscriber unit, a mobile station, a remote station, a remote terminal, an access terminal, a user terminal, a user agent, a user device, or user equipment. In some implementations a subscriber station may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless medium.

As mentioned above, in some aspects a wireless device may comprise an access device (e.g., a cellular or Wi-Fi access point) for a communication system. Such an access device may provide, for example, connectivity for or to a network (e.g., a wide area network such as the Internet or a cellular network) via a wired or wireless communication link. Accordingly, the access device may enable another device (e.g., a Wi-Fi station) to access the network or some other functionality.

A wireless device may communicate via one or more wireless communication links that are based on or otherwise support any suitable wireless communication technology. For example, in some aspects a wireless device may associate with a network. In some aspects the network may comprise a body area network or a personal area network. In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., transceiver 108) that may include various components (e.g., signal generators and signal processors) that facilitate communication over a wireless medium.

Figure 10:
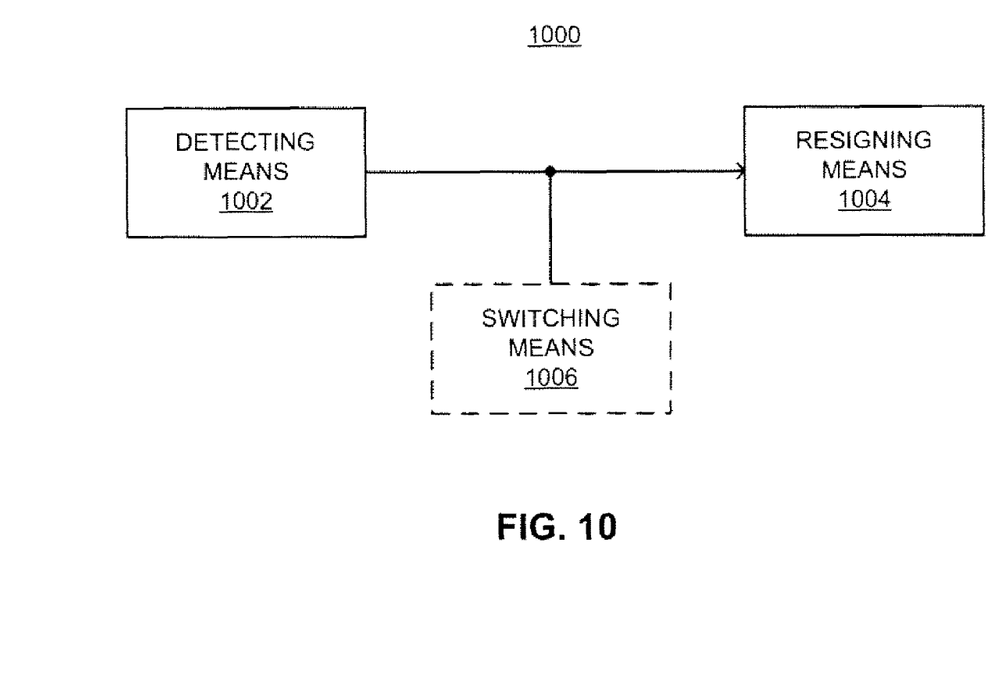
FIG. 10 is a simplified block diagram of several sample aspects of an apparatus configured to support resignation from an ad hoc network.

The components described herein may be implemented in a variety of ways. Referring to FIG. 10, an apparatus 1000 is represented as a series of interrelated functional blocks. In some aspects the functionality of these blocks may be implemented as a processing system including one or more processor components. In some aspects the functionality of these blocks may be implemented using, for example, at least a portion of one or more integrated circuits (e.g., an ASIC). As discussed herein, an integrated circuit may include a processor, software, other related components, or some combination thereof. The functionality of these blocks also may be implemented in some other manner as taught herein. In some aspects one or more of the dashed blocks in FIG. 10 are optional.

The apparatus 1000 may include one or more modules that may perform one or more of the functions described above with regard to various figures. For example, a detecting means 1002 may correspond to one or more of the monitors 112, 404, 410, and 604, and the circuit 802 as discussed herein. A resigning means 1004 may correspond to, for example, one or more of the network controllers 110, 418, 612, and 816 as discussed herein. A switching means 1006 may correspond to, for example, a mode controller 114 as discussed herein.

It should be understood that any reference to an element herein using a designation such as "first," "second," and so forth does not generally limit the quantity or order of those elements. Rather, these designations are used herein as a convenient method of distinguishing between two or more different elements. Thus, a reference to first and second elements does not mean that only two elements may be employed there or that the first element must precede the second element in some manner. Also, unless stated otherwise a set of elements may comprise one or more elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both a computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. Accordingly, it should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method operable in an ad hoc network, comprising:
    detecting a lack of activity associated with an ad hoc network, comprising at least one of:
        detecting the lack of data activity on an uplink of the terminal associated with the ad hoc network, the lack of activity on the uplink having existed for a period of time that is greater than or equal to an uplink threshold time period; and
        detecting the lack of data activity on a downlink of the terminal associated with the ad hoc network, the lack of activity on the downlink having existed for a period of time that is greater than or equal to a downlink threshold time period; and
    resigning a terminal from the ad hoc network based on the detected lack of activity.

2. A method operable in an ad hoc network, comprising:
    detecting a lack of activity associated with an ad hoc network, the detecting the lack of activity comprising at least one of:
        detecting the lack of data activity on an uplink of the terminal associated with the ad hoc network by determining whether a first activity count associated with the uplink has expired; and
        detecting the lack of data activity on a downlink of the terminal associated with the ad hoc network by determining whether a second activity count associated with the downlink has expired;
    resigning a terminal from the ad hoc network based on the detected lack of activity,
    resetting the first activity count upon transmission of data via the uplink; and resetting the second activity count upon reception of data via the downlink.

3. A method operable in an ad hoc network, comprising:
   detecting a lack of activity associated with an ad hoc network; and
   resigning a terminal from the ad hoc network based on the detected lack of activity, the lack of activity comprising an absence of application-level activity associated with the ad hoc network; and wherein the detection of the lack of activity comprises determining whether the terminal has not had any open sockets associated with the ad hoc network for a period of time that is greater than or equal to a threshold time period.

4. A method operable in an ad hoc network, comprising:
   detecting a lack of activity associated with an ad hoc network;
   resigning a terminal from the ad hoc network based on the detected lack of activity, the lack of activity comprising an absence of application-level activity associated with the ad hoc network;
   incrementing a count if the terminal does not have any open sockets associated with the ad hoc network; and
   resetting the count if the terminal has at least one open socket associated with the ad hoc network.

5. The method of claim 4, wherein the detection of the lack of activity comprises determining whether the count is greater than or equal to a count threshold.

6. A method oprable in an ad hoc network, comprising:
   detecting a lack of activity associated with an ad hoc network; and
   resigning a terminal from the ad hoc network based on the detected lack of activity, the lack of activity comprising a lack of ad hoc network beacon transmissions by any other terminal, and wherein the detection of the lack of activity comprises:
   determining whether the terminal has transmitted successive beacons for the ad hoc network; and
   determining whether a quantity of beacons that the terminal has successively transmitted is greater than or equal to a successive beacon count threshold.

7. A method operable in an ad hoc network, comprising:
   detecting a lack of activity associated with an ad hoc network; and
   resigning a terminal from the ad hoc network based on the detected lack of activity, the lack of activity comprising a lack of ad hoc network beacon transmissions by any other terminal, and wherein the detection of the lack of activity comprises:
   determining whether the terminal has transmitted successive beacons for the ad hoc network; and
   determining whether a time period during which the terminal has successively transmitted beacons is greater than or equal to a threshold time period.

8. A method operable in an ad hoc network, comprising:
   detecting a lack of activity associated with an ad hoc network; and
   resigning a terminal from the ad hoc network based on the detected lack of activity, the lack of activity comprising a lack of ad hoc network beacon transmissions by any other terminal, and wherein the detection of the lack of activity comprises:
   determining whether the terminal has transmitted successive beacons for the ad hoc network;
   incrementing a count upon transmission of each successive beacon by the terminal; and
   clearing the count upon reception of an ad hoc beacon transmitted by another terminal.

9. The method of claim 8, wherein the detection of the lack of activity comprises determining whether the count is greater than or equal to a count threshold.

10. The method of claim 1, further comprising determining whether to resign the terminal from the ad hoc network based on a configuration of the terminal.

11. The method of claim 1, further comprising electing to not resign the terminal from the ad hoc network if the terminal is initiating the ad hoc network.

12. The method of claim 1, further comprising disabling an ad hoc mode of the terminal upon resignation from the ad hoc network.

13. The method of claim 1, further comprising switching the terminal to a BSS mode upon resignation from the ad hoc network.

14. The method of claim 1, further comprising switching the terminal to a power save mode upon resignation from the ad hoc network.

15. The method of claim 14, further comprising occasionally monitoring for network activity when the terminal is in the power save mode.

16. An apparatus operable in an ad hoc network, comprising:
    an activity monitor configured to detect a lack of activity associated with an ad hoc network by at least one of detecting a lack of data activity on an uplink of the terminal that is associated with the ad hoc network, the lack of activity on the uplink having existed for a period of time that is greater than or equal to an uplink threshold time period; and detecting a lack of data activity on a downlink of the terminal that is associated with the ad hoc network, the lack of activity on the downlink having existed for a period of time that is greater than or equal to a downlink threshold time period; and
    a network controller configured to resign a terminal from the ad hoc network based on the detected lack of activity.

17. An apparatus operable in an ad hoc network, comprising:
    an activity monitor configured to detect a lack of activity associated with an ad hoc network; and
    a network controller configured to resign a terminal from the ad hoc network based on the detected lack of activity, wherein the lack of activity comprises an absence of application-level activity associated with the ad hoc network, and wherein the activity monitor is further configured to determine whether the terminal has not had any open sockets associated with the ad hoc network for a period of time that is greater than or equal to a threshold time period.

18. An apparatus operable in an ad hoc network, comprising:
    an activity monitor configured to detect a lack of activity associated with an ad hoc network; and
    a network controller configured to resign a terminal from the ad hoc network based on the detected lack of activity, wherein the lack of activity comprises a lack of ad hoc network beacon transmissions by any other terminal, and wherein the activity monitor is further configured to: determine whether the terminal has transmitted successive beacons for the ad hoc network and to determine whether a quantity of beacons that the terminal has successively transmitted is greater than or equal to a successive beacon count threshold.

19. An apparatus operable in an ad hoc network, comprising:
    an activity monitor configured to detect a lack of activity associated with an ad hoc network; and a network controller configured to resign a terminal from the ad hoc network based on the detected lack of activity, wherein the lack of activity comprises a lack of ad hoc network beacon transmissions by any other terminal, and wherein the activity monitor is further configured to: determine whether the terminal has transmitted successive beacons for the ad hoc network and to determine whether a time period during which the terminal has successively transmitted beacons is greater than or equal to a threshold time period.

20. The apparatus of claim 16, wherein the network controller is further configured to determine whether to resign the terminal from the ad hoc network based on a configuration of the terminal.

21. The apparatus of claim 16, further comprising a mode controller configured to switch the terminal to a BSS mode upon resignation from the ad hoc network.

22. The apparatus of claim 16, further comprising a mode controller configured to switch the terminal to a power save mode upon resignation from the ad hoc network.

23. An apparatus operable in an ad hoc network, comprising:
means for detecting a lack of activity associated with an ad hoc network by at least one of detecting a lack of data activity on an uplink of the terminal that is associated with the ad hoc network, the lack of activity on the uplink having existed for a period of time that is greater than or equal to an uplink threshold time period; and detecting a lack of data activity on a downlink of the terminal that is associated with the ad hoc network, the lack of activity on the downlink having existed for a period of time that is greater than or equal to a downlink threshold time period; and
means for resigning a terminal from the ad hoc network based on the detected lack of activity.

24. An apparatus operable in an ad hoc network, comprising:
means for detecting a lack of activity associated with an ad hoc network by determining whether the terminal has not had any open sockets associated with the ad hoc network for a period of time that is greater than or equal to a threshold time period, the lack of activity comprising an absence of application-level activity associated with the ad hoc network; and
means for resigning a terminal from the ad hoc network based on the detected lack of activity.

25. An apparatus operable in an ad hoc network, comprising:
means for detecting a lack of activity associated with an ad hoc network by determining whether the terminal has transmitted successive beacons for the ad hoc network and by determining whether a quantity of beacons that the terminal has successively transmitted is greater than or equal to a successive beacon count threshold, the lack of activity comprising a lack of ad hoc network beacon transmissions by any other terminal; and
means for resigning a terminal from the ad hoc network based on the detected lack of activity.

26. An apparatus operble in an ad hoc network, comprising:
means for detecting a lack of activity associated with an ad hoc network by determining whether the terminal has transmitted successive beacons for the ad hoc network and by determining whether a time period during which the terminal has successively transmitted beacons is greater than or equal to a threshold time period, the lack of activity comprising an absence of application-level activity associated with the ad hoc network; and
means for resigning a terminal from the ad hoc network based on the detected lack of activity.

27. The apparatus of claim 24, wherein the means for resigning determines whether to resign the terminal from the ad hoc network based on a configuration of the terminal.

28. The apparatus of claim 24, further comprising means for switching the terminal to a BSS mode upon resignation from the ad hoc network.

29. The apparatus of claim 24, further comprising means for switching the terminal to a power save mode upon resignation from the ad hoc network.

30. A computer-program product operable in an ad hoc network, comprising:
a computer-readable medium having non-transitory program code tangibly recorded thereon comprising:
code for causing a computer to detect a lack of activity associated with an ad hoc network by at least one of detecting a lack of data activity on an uplink of the terminal that is associated with the ad hoc network when the lack of activity on the uplink has existed for a period of time that is greater than or equal to an uplink threshold time period; and detecting a lack of data activity on a downlink of the terminal that is associated with the ad hoc network when the lack of activity on the downlink has existed for a period of time that is greater than or equal to a downlink threshold time period; and
code for causing a computer to resign a terminal from the ad hoc network based on the detected lack of activity.

31. The computer-program product of claim 30, wherein the lack of activity comprises an absence of application-level activity associated with the ad hoc network.

32. The computer-program product of claim 31, wherein the computer-readable medium further comprises code for causing a computer to determine whether the terminal has not had any open sockets associated with the ad hoc network for a period of time that is greater than or equal to a threshold time period.

33. The computer-program product of claim 30, wherein the lack of activity comprises a lack of ad hoc network beacon transmissions by any other terminal.

34. The computer-program product of claim 33, wherein the computer-readable medium further comprises code for causing a computer to determine whether the terminal has transmitted successive beacons for the ad hoc network.

35. The computer-program product of claim 34, wherein the computer-readable medium further comprises code for causing a computer to determine whether a quantity of beacons that the terminal has successively transmitted is greater than or, equal to a successive beacon count threshold.

36. The computer-program product of claim 34, wherein the computer-readable medium further comprises code for causing a computer to determine whether a time period during which the terminal has successively transmitted beacons is greater than or equal to a threshold time period.

37. The computer-program product of claim 30, wherein the computer-readable medium further comprises code for causing a computer to determine whether to resign the terminal from the ad hoc network based on a configuration of the terminal.

38. The computer-program product of claim 30, wherein the computer-readable medium further comprises code for causing a computer to switch the terminal to a BSS mode upon resignation from the ad hoc network.

39. The computer-program product of claim 30, wherein the computer-readable medium further comprises code for causing a computer to switch the terminal to a power save mode upon resignation from the ad hoc network.

* * * * *